March 31, 1925.

B. M. JOHNSON

HEAT EXCHANGER

Filed Feb. 21, 1924

INVENTOR

March 31, 1925.                    1,531,400
B. M. JOHNSON
HEAT EXCHANGER
Filed Feb. 21, 1924          3 Sheets-Sheet 2

INVENTOR

March 31, 1925.

B. M. JOHNSON

HEAT EXCHANGER

Filed Feb. 21, 1924

INVENTOR
Boyd M. Johnson
By Byrnes, Stebbins & Bundy
His Attys

Patented Mar. 31, 1925.

1,531,400

UNITED STATES PATENT OFFICE.

BOYD M. JOHNSON, OF METUCHEN, NEW JERSEY, ASSIGNOR TO THE CARBORUNDUM COMPANY, OF NIAGARA FALLS, NEW YORK, A CORPORATION OF PENNSYLVANIA.

HEAT EXCHANGER.

Application filed February 21, 1924. Serial No. 694,262.

*To all whom it may concern:*

Be it known that I, BOYD M. JOHNSON, a citizen of the United States, residing at Metuchen, county of Middlesex, State of New Jersey, have invented a new and useful Improvement in Heat Exchangers, of which the following is a full, clear, and exact description.

This invention relates broadly to heat exchangers, and more particularly to heat exchangers of the type adapted for transferring heat from waste gases to air or other gases, and generally referred to as recuperators.

The construction of refractory recuperators has been limited, due to the difficulty of manufacturing the complicated shapes heretofore used in their construction. The present invention provides an efficient refractory recuperator the main heat transfer portion of which is composed of simple thin-walled hollow tile placed open end to open end to form continuous flues for the passage of the waste gases and spacer blocks completely encircling and sealing the joints between the hollow tile and forming with said tile a portion of the walls of a passage for the air entirely around the tile, said passage consisting of a plurality of individual flues. The invention is not limited to the use of any particular refractory material but I prefer to construct the tile and spacer blocks of silicon carbide, because this material has certain properties which function together in a way to give most efficient results when employed as a heat transfer medium. These properties of silicon carbide are its high heat emissivity factor, its high thermal conductivity, its low coefficient of expansion and its great mechanical strength, the latter property particularly enabling it to be employed in relatively thin sections without danger of rupture.

Certain preferred embodiments of my invention are shown in the accompanying drawings, in which—

Figure 2:
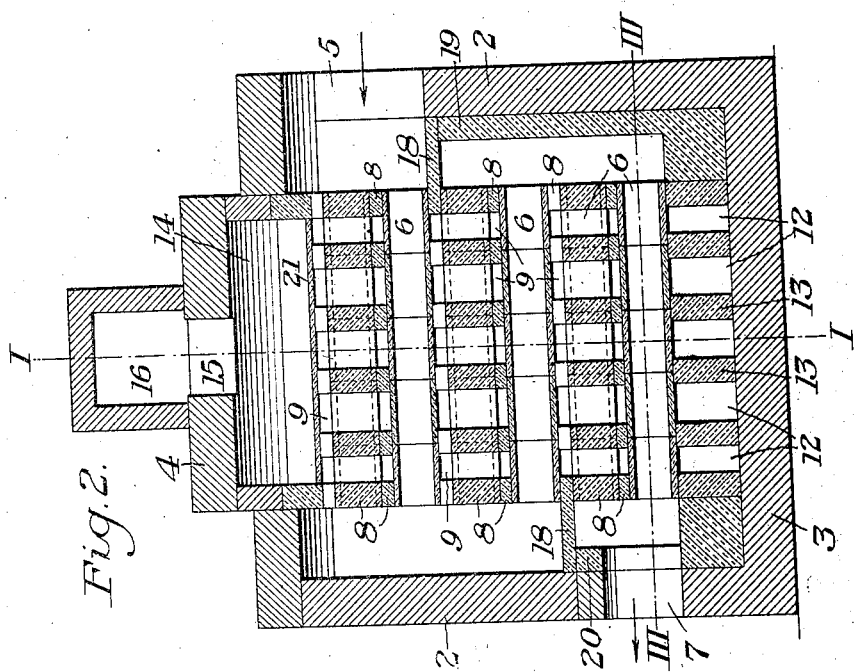
Figure 2 is a section of the recuperator at right angles to the section of Figure 1, the section being taken on the line II—II of Figure 1.
Figure 1:
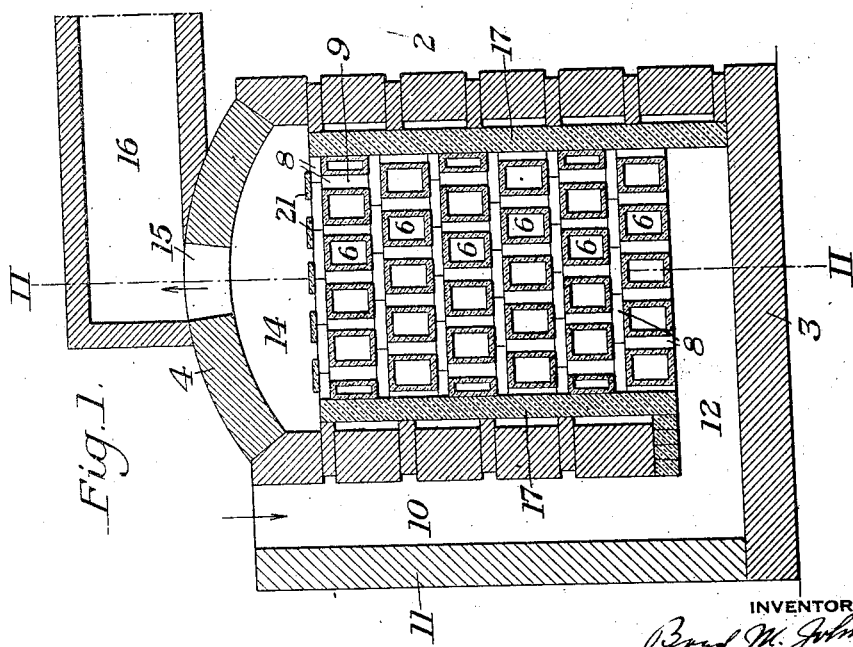
Figure 1 is a section through one form of recuperator, the section being taken on the line I—I of Figure 2.
Figure 3:
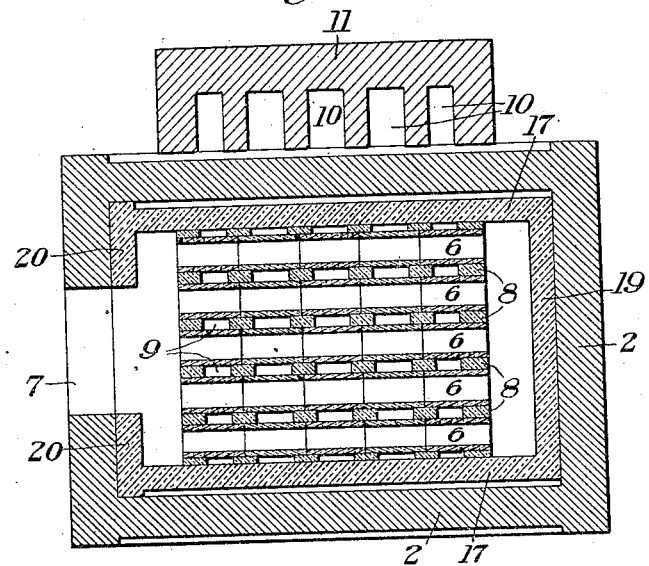
Figure 3 is a sectional plan view of the recuperator, the section being taken on the line III—III of Figure 2.

Referring to the form of invention shown in Figures 1 to 3, inclusive, the recuperator comprises outer surrounding walls 2, a floor 3 and a roof 4, all of which are constructed of the usual fireclay refractory material. The waste gases enter the recuperator through an inlet 5, and after passing through a series of continuous flues 6, leave the recuperator through an outlet 7. These flues are constructed of thin walled hollow tile placed open end to open end. The individual flues for the air are formed by placing spacer blocks 8 between the flues 6, these spacer blocks being placed at and completely encircling the joints between the hollow tile, thereby sealing these joints and preventing leakage of air into the flues 6. The hollow tile forming the flues 6 are preferably rectangular in cross section and preferably all of the same length, so that the spacer blocks surrounding the joints between the hollow tile form a plurality of independent air flues 9 extending at right angles to the gas flues 6.

Vertical air intake flues 10 are formed in an outer fireclay wall 11, these vertical flues communicating with horizontal flues 12 in the base of the recuperator. The horizontal flues 12 are separated from each other by partition walls 13 which support the lower bank of gas flues 6, and cooperate with spacer blocks 8 to seal the joints between the hollow tile forming this lower bank of gas flues. The air entering a flue 10 passes to the horizontal flue 12 communicating therewith and then passes upwardly in a sinuous path through an air flue 9 and enters a space 14 between the upper bank of gas flues 6 and the roof 4 of the recuperator. The heated air leaves this space through an opening 15 in said roof and enters an offtake flue 16. The gas flues and in each bank are staggered with relation to the gas flues in the bank immediately below or above the same, thereby causing the air in its upward flow through the air flues 9 to wipe the four sides of the hollow tile forming the flues through which the hot gases are passing and also increasing the length of the path of travel of the air.

Figure 4:
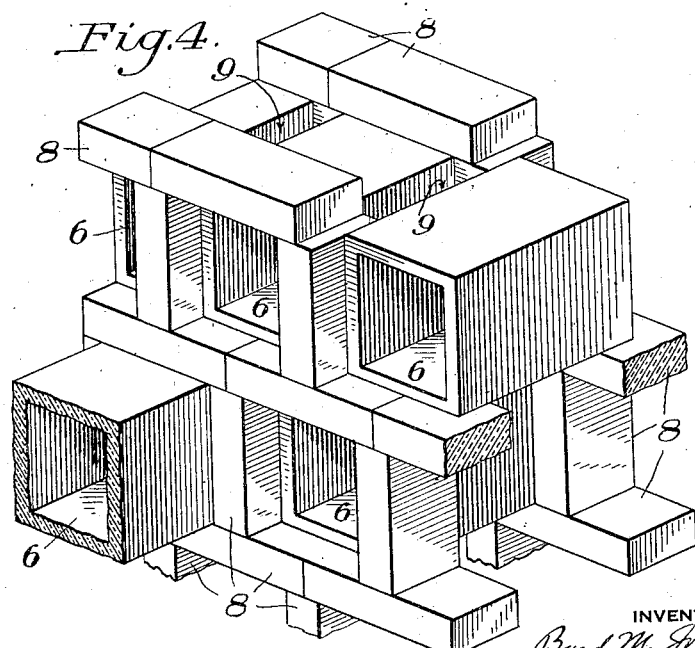
Figure 4 is a detail view on an enlarged scale illustrating the manner of assembling the tile and spacer blocks.

The spacer blocks, being stronger than the hollow tile, are made to carry the major portion of the weight of the recuperator by placing the horizontal spacer blocks so that they span the distance between the vertical spacer blocks. The vertical spacer blocks thus transfer the load imposed on the horizontal spacer blocks placed above the tile to the horizontal spacer blocks placed beneath the tile. In this way much of the strain is taken from the thin-walled hollow tile forming the gas flues. The manner in which the hollow tile and the spacer blocks are assembled will be more apparent by reference to Figure 4.

The outer portions of the recuperator which allow for either ingress or egress of waste gases or air must naturally be open, but along the sides of the heat transfer portion of the recuperator which do not allow for passage of waste gases or air are placed solid walls 17 extending the entire height and length of the heat transfer portion of the recuperator. These walls together with the tile and spacer block form the walls of the air flues 9 and are spaced from the outer fireclay walls 2 of the recuperator in order to allow expansion joints between the walls 17 and the outer walls 2. Baffles 18 control the flow of the waste gases through the recuperator and these baffles extend between the ends of certain of the gas flues 6 and take the place of spacer blocks 8. At their outer ends these baffles are supported upon walls 19 and 20 integral with the side walls 17. The tile forming the gas flues, the spacer blocks, the baffles 18 and the walls 13, 17, 19 and 20 are all formed of the same refractory material, so that there will be no differences in expansion and consequent leakage due to displacement of the spacer blocks. All of the hollow tile and spacer blocks will preferably be made of silicon carbide, in which case the baffles 18 and walls 13, 17, 19 and 20 will also be constructed of silicon carbide. The solid walls 17 of silicon carbide forming the side walls of the heat transfer portion of the recuperator and a portion of the walls of the air passage while they prevent leakage due to displacement under unequal expansion, also permit for the allowance of a sufficient expansion joint between the main body of the recuperator and the surrounding fireclay walls, such expansion joint relieving the recuperator of any strains due to a decrease in the width of the surrounding chamber formed by the outer fireclay walls 2.

It will be noted by reference to Figures 1 and 2 that the uppermost courses of horizontal spacer blocks are bridged at the joints by transversely extending slabs 21. These slabs will be constructed of the same refractory material as the tile and other parts of the heat transfer portion of the recuperator. These slabs are simply utilized as additional heat transfer elements and to further increase the length of the path of travel of the air. It will further be noted that in order to offset the gas flues in one bank from those in the bank immediately below or above the same, I employ for certain of the flues tile having one half the width of the tile forming the other flues.

Figure 5:
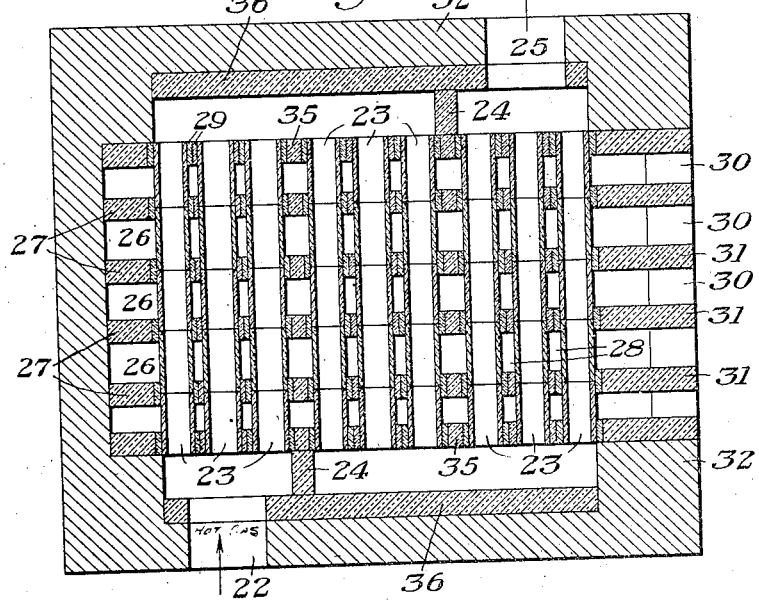
Figure 5 is a sectional plan view of another form of recuperator, the section being taken on the line V—V of Figure 6.
Figure 6:
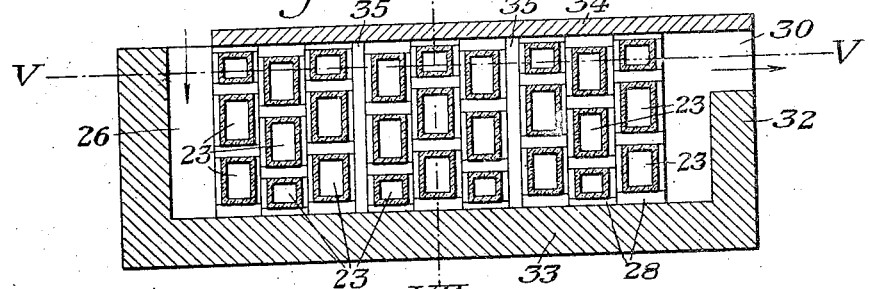
Figure 6 is a section of the recuperator shown in Figure 5, the section being taken on the line VI—VI of Figure 7.
Figure 7:
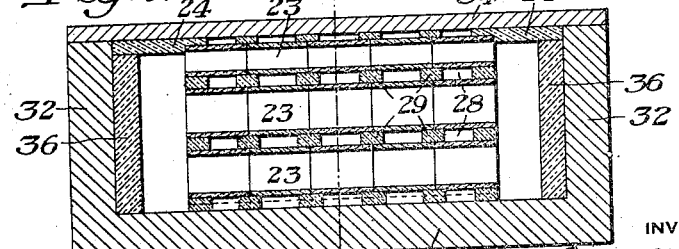
Figure 7 is a section at right angles to the section of Figure 6, the section being taken on the line VII—VII of Figure 6.

In Figures 5, 6 and 7 I have illustrated a form of recuperator particularly adapted for use where the vertical space available for the recuperator is limited. In this form of the invention the waste gases enter the recuperator through an inlet 22 and pass through a series of gas flues 23 formed of hollow tile in the same manner as the gas flues 6. Baffles 24 compel these gases to make several passes the width of the recuperator before leaving the recuperator through the outlet 25. The air enters the recuperator through a series of vertical flues 26 separated from each other by partition walls 27. These flues communicate with horizontal air flues 28 formed by the spacer blocks 29 which surround the tile of the gas flues at the joints between such tile. After passing through the horizontal flues 28 the heated air leaves the recuperator through the outlets 30 separated from each other by partition walls 31. The outer surrounding walls 32, the floor 33 and the roof 34 of the recuperator are constructed of fireclay refractory material as in the construction shown in Figures 1, 2 and 3. The flat roof 34 is supported in part by the side walls 32 and in part by vertical posts 35 extending between the roof and floor of the recuperator. The outer fireclay side walls 32 of the recuperator opposite the ends of the gas flues 23 are lined with walls 36.

The tile forming the flues 23, the spacer blocks 29, and baffles 24, the posts 35 and the walls 36 will all be formed of the same refractory material, preferably silicon carbide, so that there will be no difference in expansion and consequent leakage due to displacement of the spacer blocks surrounding the joints between the tile.

From the above description the advantages of my invention will be apparent to those skilled in the art. The main heat transfer portion of the recuperator is constructed of simple thin-walled hollow tile and scraper blocks. The tile are formed without tongues, or grooves, laps or other complicated joints, and the spacer blocks which adequately seal the joints between the tile are plain rectangular shapes, easily manufactured. By constructing all of the hollow tile the same length and placing them in banks so that the end joints are in vertical planes, the spacer blocks form vertical solid division walls, thus dividing the space between the gas flues into a series of flues for the air instead of one continuous passage. This is a decided advantage since, should a hollow tile crack or break, the efficiency of the recuperator would only be decreased by leakage of air from a single air flue rather than from the entire space allowed for air travel. These division walls are carried to the inlet for the air, so that any air flue may be shut off entirely if desired and the remaining portions of the recuperator operated. This enables a run to be completed without materially reducing the efficiency of the recuperator. The sinuous flow of the air allows the maximum of contact with the surfaces transmitting the heat, and by such sinuous flow prevents any stratification of the air in its travel, as each ascending column of air impinges directly on a heated surface. By this method of construction, the entire heat exchange portion of the recuperator is free and self supporting, and since such portion is constructed of the same material, each integral part of such portion will hold its original relation to every other part thereof with changes in temperature. The construction is such, moreover, that sufficient space is allowed at the ends of the gas flues for ready inspection between runs and for minor repairs. By the construction employed, the weight of the heat exchange portion of the recuperator is carried largely by the spacer blocks, thus relieving the weaker hollow tile from excessive strains and permitting tile having very thin walls to be employed.

While the general construction is applicable to any refractory material of reasonably high heat conductivity, the construction is particularly applicable to silicon carbide because its high refractoriness and low co-efficient of expansion insure long life and its high heat conductivity and emissivity render this material the most efficient refractory heat transmitting medium. Due to the fact that silicon carbide has a high heat conductivity, the spacer blocks as well as the hollow tile walls will readily take heat from those portions of the hollow tile covered by the spacer blocks and will in turn give up such heat to the air. The use of these solid spacer blocks will, therefore, not materially reduce the effective heat transmitting surface of the hollow tile.

While I have shown and described certain preferred embodiments of my invention, it will be understood that changes may be made in the details of construction shown without departing from the spirit of the invention or scope of my broader claims.

I claim:

1. A heat exchanger, comprising gas flues formed of hollow tile placed open end to open end, and spacer blocks sealing the joints between the tile of said flues and forming with said tile a portion of the walls of a passage for the medium to be heated, substantially as described.

2. A heat exchanger, comprising gas flues formed of hollow tile of the same length placed open end to open end and having all corresponding end joints located in the same plane, and spacer blocks sealing said joints and forming with said tile a portion of the walls of a series of individual flues for the passage of the medium to be heated, substantially as described.

3. A heat exchanger, comprising a plurality of banks of gas flues formed of hollow tile placed open end to open end, the flues in one bank being staggered with respect to the flues in the bank on either side thereof, and spacer blocks sealing the joints between the tile of said flues and forming with said tile a portion of the walls of a passage for the medium to be heated, substantially as described.

4. A heat exchanger, comprising gas flues formed of hollow tile placed open end to open end, and vertical and horizontal spacer blocks sealing the joints between the tile of said flues and forming with said tile a portion of the walls of a passage for the medium to be heated, said spacer blocks being arranged so that the horizontal blocks span the distance between the vertical blocks and are supported by the latter, substantially as described.

5. A heat exchanger, comprising gas flues formed of hollow tile of the same length placed open end to open end and having all corresponding end joints located in the same vertical plane, and vertical and horizontal spacer blocks sealing said joints and forming with said tile a portion of the walls of a series of individual flues for the passage of the medium to be heated, said spacer blocks being arranged so that the horizontal blocks span the distance between the vertical blocks and are supported by the latter, substantially described.

6. A heat exchanger, comprising outer walls defining a chamber, a plurality of gas flues within said chamber formed of hollow tile placed open end to open end, spacer blocks sealing the joints between the tile of said flues and forming with said tile a portion of the walls of a passage for the medium to be heated, baffle plates extending between the ends of certain of the flues, and lining walls supporting the outer ends of said baffle plates and spaced from the ends of the gas flues, the tile, spacer blocks, baffle plates and lining walls being formed of the same refractory material, substantially as described.

7. A heat exchanger, comprising outer walls defining a chamber, a plurality of gas flues within said chamber formed of hollow tile placed open end to open end, spacer blocks sealing the joints between the tile of said flues and forming with said tile a portion of the walls of a plurality of individual flues for the passage of the medium to be heated, and an individual inlet flue for each of said last mentioned flues, substantially as described.

8. A heat exchanger, comprising outer walls defining a chamber, a plurality of gas flues within said chamber formed of hollow tile placed open end to open end, spacer blocks sealing the joints between the tile of said flues, and lining walls placed along the sides of the heat transfer portion of the heat exchanger formed by said flues and spacer blocks and forming with said tile and spacer blocks the walls of a passage for the medium to be heated, said lining walls being spaced from the opposite outer side walls of said chamber to allow expansion between said lining walls and outer side walls, said tile, spacer blocks and lining walls being formed of the same refractory material, substantially as described.

9. A heat exchanger, comprising outer walls defining a chamber, a plurality of gas flues within said chamber and having their opposite ends spaced from the opposite end walls of said chamber, said flues being formed of hollow tile placed open end to open end, spacer blocks sealing the joints between the tile of said flues, lining walls placed along the sides of the heat transfer portion of the heat exchanger formed by said flues and spacer blocks and forming with said tile and spacer blocks the walls of a passage for the medium to be heated, said lining walls being spaced from the opposite outer side walls of said chamber to allow expansion between said lining walls and outer side walls, and lining walls for the outer end walls of said chamber, said tile, spacer blocks and lining walls being formed of the same refractory material, substantially as described.

10. A heat exchanger, comprising outer walls defining a chamber, and heat transfer means within said chamber comprising a plurality of gas flues formed of hollow tile placed open end to open end, spacer blocks sealing the joints between the tile of said flues and forming with said flues a portion of the walls of a passage for the medium to be heated, and walls supporting said heat transfer means in spaced relation to the floor of said chamber, the spaces between said supporting walls forming flues for conducting the medium to be heated to said passage, the tile spacer blocks and supporting walls being formed of the same refractory material, substantially as described.

In testimony whereof I have hereunto set my hand.

BOYD M. JOHNSON